United States Patent

[11] 3,621,407

[72] Inventors George M. Low
Acting Administrator of the National Aeronautics and Space Administration with respect to an invention of;
William J. Kerwin, Tucson, Ariz.; Charles V. Shaffer, Gainesville, Fla.

[21] Appl. No. 15,024
[22] Filed Feb. 27, 1970
[45] Patented Nov. 16, 1971

[54] MULTILOOP RC ACTIVE FILTER APPARATUS HAVING LOW-PARAMETER SENSITIVITY WITH LOW-AMPLIFIER GAIN
10 Claims, 14 Drawing Figs.

[52] U.S. Cl. ........................................................ 328/167, 307/230, 307/295, 328/142, 330/85, 330/70 R, 333/80
[51] Int. Cl. ........................................................ H03b 1/04
[50] Field of Search ............................................ 328/165, 167, 142, 145; 307/229, 230, 295; 330/85; 333/70 R, 80

[56] References Cited

UNITED STATES PATENTS

| | | | |
|---|---|---|---|
| 3,107,331 | 10/1963 | Barditch et al. .............. | 330/85 X |
| 3,333,207 | 7/1967 | Bento et al. .................. | 307/230 X |
| 3,448,289 | 6/1969 | Harris .......................... | 328/145 X |

*Primary Examiner*—Stanley T. Krawczewicz
*Attorneys*—Darrell G. Brekke and G. T. McCoy

ABSTRACT: A multiloop RC active filter network having low parameter sensitivity with low amplifier gain comprising at least two passive components and two voltage amplifiers one of which has a positive gain $K_1$ which is less than unity and the other providing a negative gain of magnitude of $K_2$ in the outer feedback loop. These circuits can provide any Q and can be made to oscillate with $K_1$ and $K_2$ within certain given ranges. Monolithic integrated circuit thick or thin film techniques are used in the preferred embodiment to provide the passive RC components.

INVENTORS
WILLIAM J. KERWIN
CHARLES V. SHAFFER
BY
ATTORNEYS

INVENTORS
WILLIAM J. KERWIN
CHARLES V. SHAFFER
BY
ATTORNEYS

INVENTORS
WILLIAM J. KERWIN
CHARLES V. SHAFFER
BY
[signatures]
ATTORNEYS

INVENTORS
WILLIAM J. KERWIN
CHARLES V. SHAFFER
BY
ATTORNEYS

INVENTORS
WILLIAM J. KERWIN
CHARLES V. SHAFFER
BY
Darrell G. Brekke
G. T. McCoy
ATTORNEYS

INVENTORS
WILLIAM J. KERWIN
CHARLES V. SHAFFER
BY
ATTORNEYS

MULTILOOP RC ACTIVE FILTER APPARATUS HAVING LOW-PARAMETER SENSITIVITY WITH LOW-AMPLIFIER GAIN

The invention described herein was made in the performance of work under a NASA contract and is subject to the provisions of Section 305 of the National Aeronautics and Space Act of 1958, Public Law 85–568 (72 Stat. 435, 42 U.S.C. 2457).

BACKGROUND OF THE INVENTION

The present invention relates generally to electronic filter apparatus and, more particularly, to multiloop RC active filter networks having low-parameter sensitivity with low-amplifier gain.

A device for providing any rational transfer function can be realized by providing a cascade of RC active two--port networks each of which realizes at most the general biquadratic function. Amongst the prior art, Sallen and Key have described, in IRE Transactions on Circuit Theory, CT–2, No. 1, Mar. 1955, pp. 74–85, many second order networks using a single VCVS and one feedback loop which does not individually combine the benefits of low-parameter sensitivity and low-VCVS gain. Kerwin, Huelsman and Newcomb, IEEE Journal of Solid-State Circuits, SC–2, No. 3, Sept. 1967, pp. 87–92, have disclosed a state variable synthesis method to achieve a second order transfer function with extremely low-parameter sensitivity. This method uses three or four operational amplifiers and only two capacitors. However, the frequency range of the operational amplifiers is limited because of the gain required. Kerwin and Shaffer have disclosed, in Proceedings of the Eleventh Midwest Symposium on Circuit Theory, May 13–14, 1968, pp. 79–88 that one way to trade off parameter sensitivity and amplifier gain is to use phantom zeros in the near right-half plane. These networks, however, do not adequately overcome the frequency-gain problem when they use distributed elements and do not adequately overcome the passive element sensitivity problem if lumped elements are used.

Although certain prior art structures have been found most acceptable when the operating frequency is not too high, when distributed passive elements are used the required active element gain is difficult to obtain with the necessary precision and phase at high frequencies. Where it is desirable that the networks be formed of integrated circuits, stability of performance requires that the sensitivity of the network to its various components be minimized. Because of the difficulty of obtaining precise parameter values in integrated circuit apparatus, it is necessary that steps be taken to render any circuit utilizing integrated circuit techniques relatively insensitive to the particular values of the respective circuit components. If the networks are to be useful at high frequencies, it is also necessary that the use of high-gain amplifiers not be required. And finally, for convenience in construction, it is preferable that a minimum number of capacitors be used in the implementing circuitry.

OBJECTS OF THE PRESENT INVENTION

It is therefore a primary object of the present invention to provide a filter means for producing transfer functions having complex poles and/or zeros using integrated circuit technology.

Another object of the present invention is to provide an active filter network for producing transfer functions having complex poles and/or zeros and which includes simple passive element structures with two or more active elements utilized in such a way that the circuitry has low sensitivity to variations in the passive elements without requiring high gains from any of the active elements so as to make operation at high frequency possible, or if operated at moderate frequencies, to improve the stability.

Still another object of the present invention is to provide a novel filter means for producing transfer functions using two passive components and two voltage amplifiers one of which has a positive gain which is less than unity and the other having a negative gain.

SUMMARY OF THE PRESENT INVENTION

In accordance with the present invention, multiloop RC active filter networks having low-parameter sensitivity with low-amplifier gain are provided which use at least two passive components and two voltage amplifiers one of which has a positive gain $K_1$ which is less than unity and the other providing a negative gain of magnitude $K_2$ in the outer feedback loop. These circuits can provide any Q and can be made to oscillate with $K_1$ and $K_2$ within certain given ranges. Monolithic integrated circuit thick or thin film techniques are used to provide the passive components in the form of a distributed resistance-capacitance line. This line may be tapered in resistance or capacitance, or both, or may be linear. In addition, nonideal amplifiers may be used. For example, the amplifier $K_1$ may be formed by two cascaded emitter-followers with a resistive voltage divider coupling the two emitter-followers.

Circuits in accordance with the present invention provide lower sensitivity to environmental changes than are possible with single amplifier, single feedback loop designs. Moreover, lower gain amplifiers can be used in the present invention than in single loop structures with low sensitivity to gain changes.

The many advantages of the present invention will become apparent to one skilled in the art after having read the following detailed descriptions of preferred embodiments which are illustrated in the several figures of the drawings.

IN THE DRAWINGS

DESCRIPTION OF THE PREFERRED EMBODIMENTS

Figure 1:
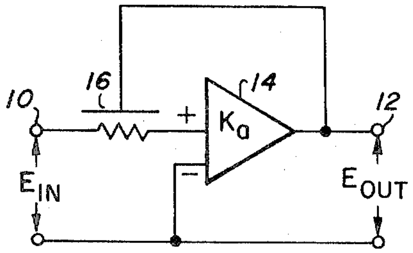
FIG. 1 is a simple second-order active RC filter using an integrated circuit distributed passive element.

The use of integrated circuit distributed elements in transfer function generating apparatus provides a unique advantage over the use of lumped elements in that an essentially second-order bandpass function can be obtained with a single resistor and a single capacitor. This results in an active RC filter having 0 Q sensitivity to passive element variation. In addition, the voltage gain required even for high Q is very low (maximum $K_a$=0.9296). The simplest network of this type is the positive gain circuit shown in FIG. 1 which includes a pair of input terminals 10, a pair of output terminals 12, an amplifier 14 and an RC distributed element 16. The transfer function of this circuit is $$(1)\qquad T_a(p)=\frac{E_2}{E_1}=\frac{K_a/(1-K_a)}{\cos h\sqrt{RCp}+K_a/(1-K_a)}$$

Figure 2:
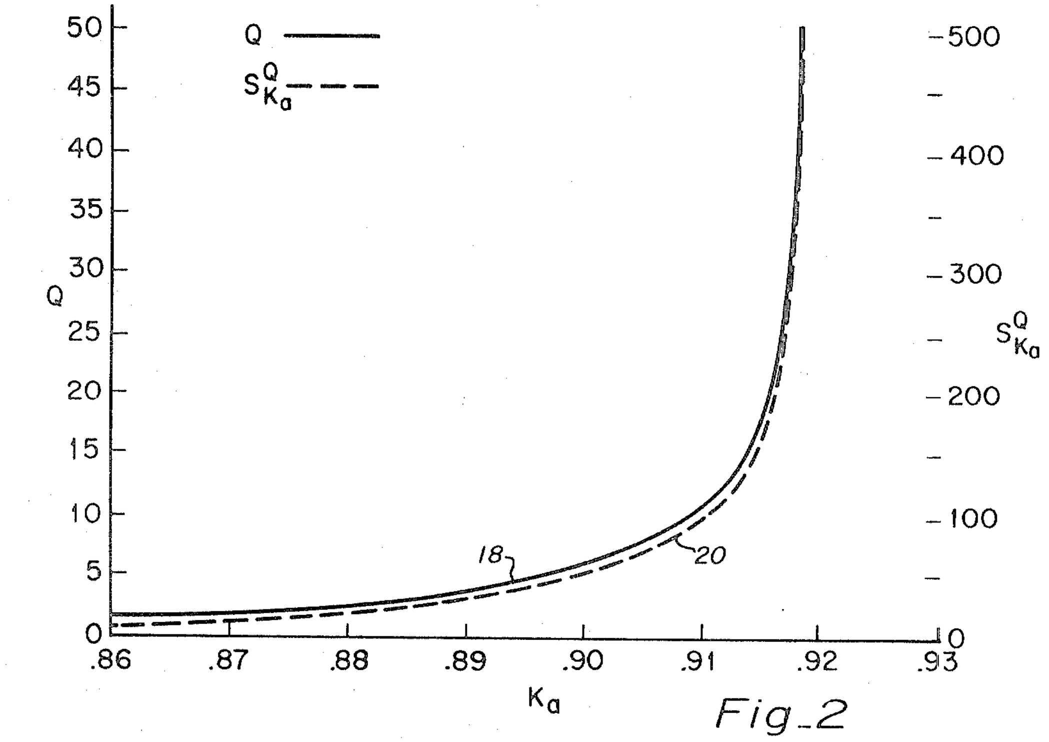
FIG. 2 is a diagram of the Q and Q sensitivity vs. $K_a$ curves for the simplified network illustrated in FIG. 1.

The Q of this network as a function of amplifier gain, $K_a$, is shown in FIG. 2 by the curve 18. In addition, the Q sensitivity to changes in the amplifier gain $S^Q_{K_a}$ is shown at 20 in FIG. 2 and may be expressed as $$(2)\qquad S^Q_{K_a}\cong 8.2Q-11.5+(9.5/Q)\text{ for }Q\geq 2$$

The strongly increasing sensitivity of the network to amplifier gain at high values of $Q$ restricts the use of this network to low-$Q$ applications.

Figure 3:
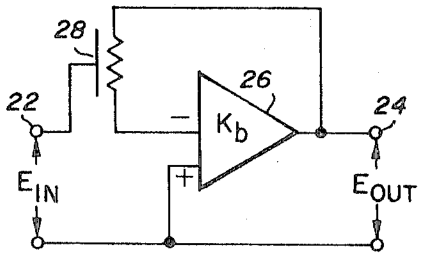
FIG. 3 is a simple second-order active RC filter using an integrated circuit distributed passive element.

The negative gain network shown in FIG. 3 including input terminals 22, output terminals 24, amplifier 26 and the distributed RC element 28, is also capable of producing a pair of high-Q poles and has 0 sensitivity to passive element variations; however, the gain required is much higher ($K_b\leq 11.59$). The transfer function of this circuit is $$(3)\qquad T_b(p)=\frac{-K_b\ (\cos h\sqrt{RCp}-1)}{\cos h\sqrt{RCp}+K_b}$$

Figure 4:
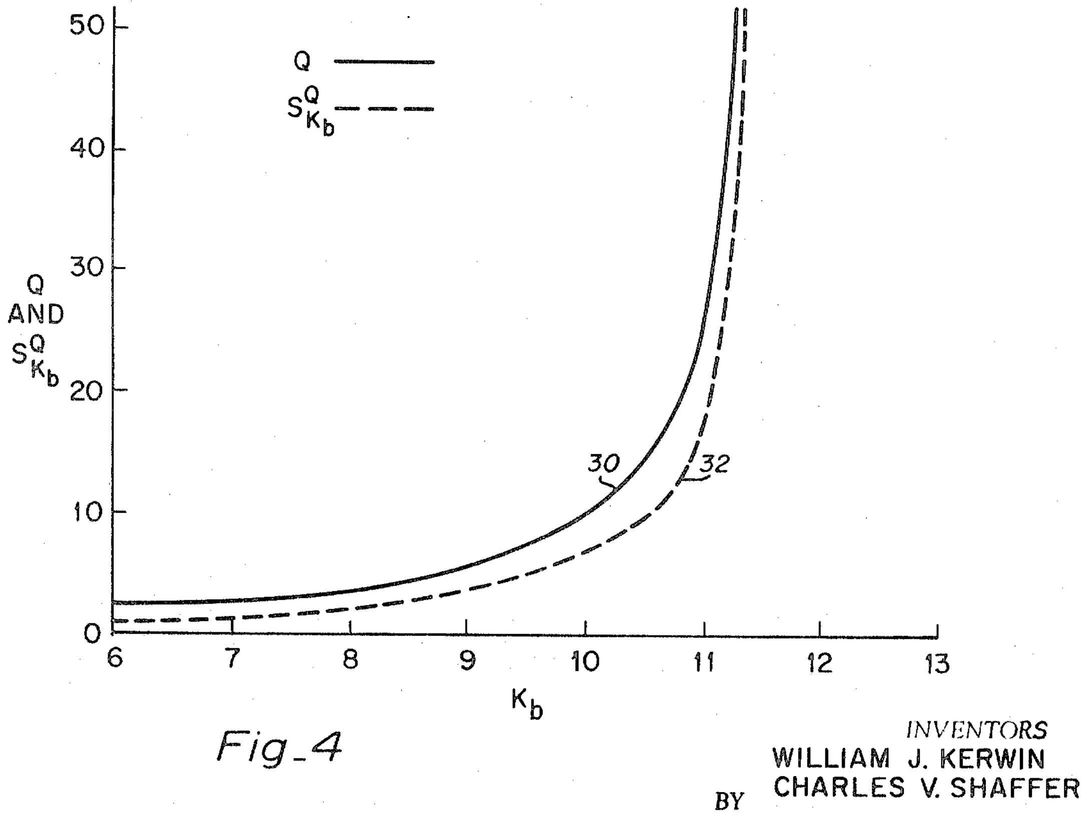
FIG. 4 is a diagram of the Q and Q sensitivity vs. $K_b$ curves for the network of FIG. 3.

The variation of Q with gain $K_b$ for this network is shown by the curve 30 in FIG. 4. The variation of Q sensitivity with $K_bS^Q_{K_b}$ is also shown at 32. In this case, $$(4)\qquad S^Q_{K_b}\cong 0.65Q\text{ for }Q\geq 100$$

Although the $Q$ sensitivity to gain change is greatly reduced in this case, the reduction is nearly proportional to the increased gain required and no significant overall improvement has been achieved in terms of extending the upper frequency limit of operation.

Figure 5:
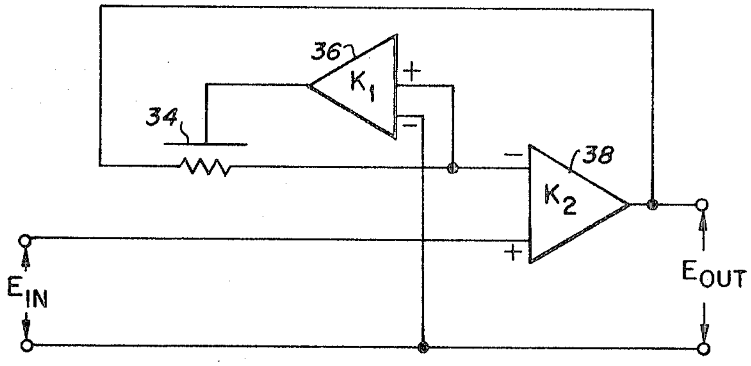
FIG. 5 is a multiloop transfer function generating apparatus using distributed active RC elements in accordance with the present invention.

By using both positive and negative feedback loops in a single circuit it is possible to combine the advantages of low-VCVS gain and low-Q sensitivity to gain. The basic circuit is shown in FIG. 5 and utilizes a single distributed passive element 34 (one resistor and one capacitor) in combination with the amplifiers 36 and 38 to obtain 0 Q sensitivity to passive element variation. This example uses at most two passive components and two voltage amplifiers, one of which has a gain less than unity and the other has a differential input and provides a negative gain magnitude, $K_2$ (typically between 2 and 5) to the other feedback loop. This circuit can provide any Q and can be made to oscillate with $K_1$ and $K_2$ within the given ranges. Passive element 34 is an RC line of resistive material (formed using monolithic thick or thin film integrated circuit techniques) separated from a conducting film by a dielectric material to form a distributed resistance-capacitance line. This line may be tapered in resistance or capacitance or both, or may be linear. Nonideal amplifiers may be used for amplifiers 36 and 38. For example, $K_1$ may be realized by two cascaded emitter-followers with a resistive voltage divider coupling the two emitter-followers.

Figure 6:
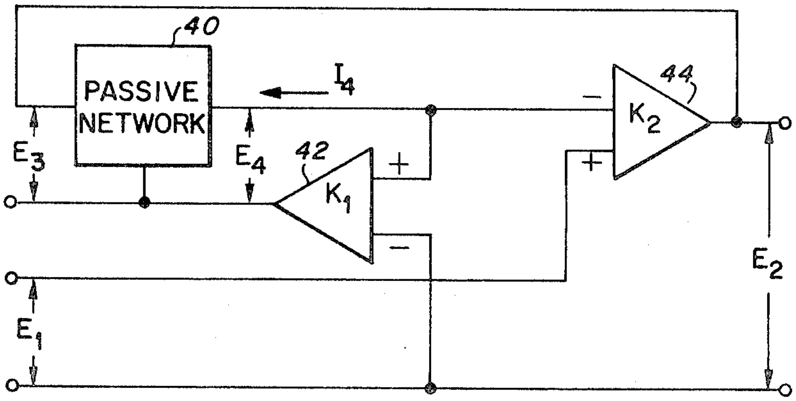
FIG. 6 is a generalized transfer function generator network in accordance with the present invention.

A more general configuration which may be used for purposes of analysis is shown in FIG. 6 and includes a passive, three-terminal network 40, a positive gain amplifier 42 and a negative gain amplifier 44. Where the passive network 40 has a voltage transfer function of $$(5)\qquad T_1(p)=\left.\frac{E_4}{E_3}\right|_{I_4=0}$$

then the overall transfer function of the circuit of FIG. 6 is $$(6)\qquad T_2(p)=\frac{E_2}{E_1}=K_2\frac{T_1^{-1}(p)+\dfrac{K_1}{1-K_1}}{T_1^{-1}(p)+\dfrac{K_1+K_2}{1-K_1}}$$

In many practical cases, the Q of the response is essentially determined by the denominator or Eq. (6). This is especially true when $T_1^{-1}(p)$ is an entire function and for Q's above two or more.

Since the transfer function of the circuit of FIG. 5, $$(7)\qquad T_1^{-1}(p)=\cos h\sqrt{RCp}$$

is an entire function, the numerator of Eq. (6) can be assumed to have only a small effect on Q. Under this assumption (the validity of which has been verified by experiment), Q can be considered a function of M only, where M is defined as $$(8)\qquad M\triangleq\frac{K_1+K_2}{1-K_1}$$

Q($M$) can be measured experimentally or computed by letting $K_1=0$. The computed value of Q($M$) is given by the curve 30 in FIG. 4, since $M=K_2=K_b$ when $K_1=0$. Analytically, it can be shown that $$(9)\qquad Q\cong\frac{-14.23+5.06M-0.20M^2}{11.59-M}$$

or, conversely, $$(10)\qquad M\cong 11.59-\frac{17.98}{Q}+\frac{15.41}{Q^2}$$

Similarly, $S^Q_M=S^Q_{K_b}$ when $K_1=0$, therefore, the curve 32 of FIG. 4 gives the value of $S^Q_M$ as a function of $M$, or $K_b$, since $M=K_b$ for $K_1=0$. A reasonably accurate analytical relation for $S^Q_M$ is $$(11)\qquad S^Q_M\cong 0.65Q\text{ for }Q\geq 100$$

Thus, the desired $Q$ determines the values of $M$ and $S^Q_M$, but the individual values of $K_1$ and $K_2$ are not yet fixed for the general case when $K_1\neq 0$. It is appropriate to choose $K_1$ and $K_2$ so as to minimize some measure of the system's $Q$ sensitivity.

It is easily shown that $$(12)\qquad S_{K_1}{}^Q=S_M{}^QS_{K_1}{}^M=S_M{}^Q\frac{K_1(1+K_2)}{(K_1+K_2)(1-K_1)}=S_M{}^Q\frac{M+1}{M}\,\frac{K_1}{1-K_1}$$

and $$(13)\qquad S_{K_2}{}^Q=S_M{}^QS_{K_2}{}^M=S_M{}^Q\frac{K_2}{K_1+K_2}=S_M{}^Q\left[1-\frac{K_1}{M(1-K_1)}\right].$$

Equations (12) and (13) allow $S^Q_{K_1}$ and $S^Q_{K_2}$ to be calculated for any $Q$ and $K_1$ since $Q$ determines $M$. (Eq. (10), and $S^Q_M$, (Eq. (11)), and $M$ and $K_1$ allow the determination of the value of $K_2$, (Eq. (8)).

Figure 7:
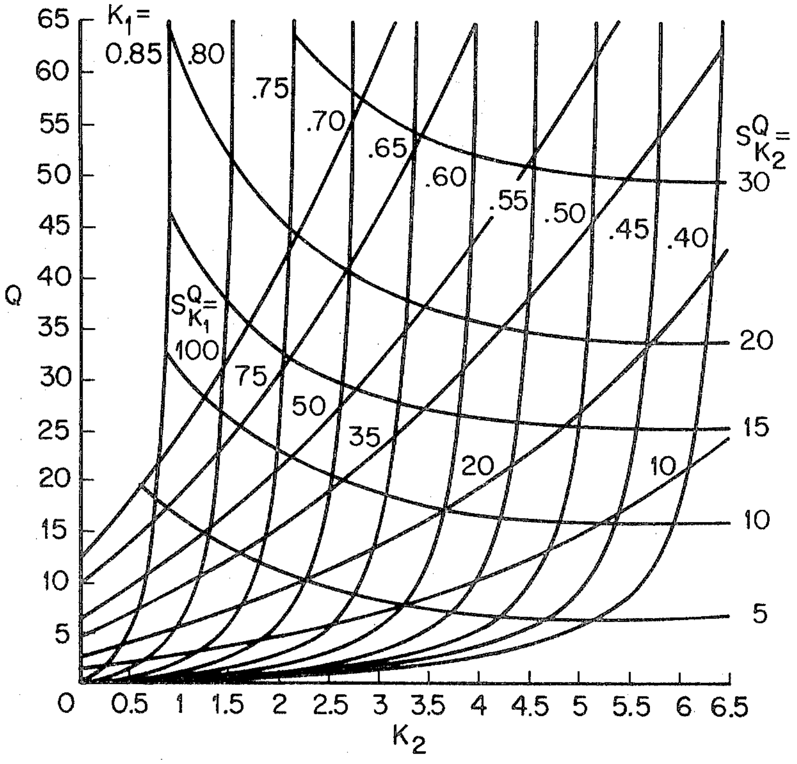
FIG. 7 is a diagram illustrating the Q vs. $K_2$ and $K_1$ curves for the circuit illustrated in FIG. 5 regardless of the values of R or C.

The calculated Q as a function of $K_1$ and $K_2$ is shown in FIG. 7. The values of $S^Q_{K_1}$ and $S^Q_{K_2}$ are also shown. For a fixed Q, hence, a fixed M as defined by Eq. (10), increasing $K_1$, ($0<K_1<0.92$, increases $S^Q_{K_1}$ and decreases $S^Q_{K_2}$ as shown in FIG. 7. It is thus possible to define constants "$a$" and "$b$" whose relative values can be chosen to satisfy the conditions $$(14)\qquad aS_{K_1}{}^Q-bS_{K_2}{}^Q=0$$

or $$(15)\qquad \frac{S_{K_1}{}^Q}{S_{K_2}{}^Q}=\frac{b}{a}$$

If one desires equal $Q$ sensitivities for the two amplifiers, let $a=b$ and obtain from Eqs. (12) and (13) the equation $$(16)\qquad \frac{M+1}{M}\,\frac{K_1}{1-K_1}=1-\frac{K_1}{M(1-K_1)}$$

which leads to $$(17a)\qquad K_1=\frac{M}{2(M+1)}$$

(17*b*) $$K_2=\frac{M}{2}$$

and (17*c*) $$S_{K_1}{}^{Q}=S_{K_2}{}^{Q}=S_M{}^{Q}\frac{M+1}{M+2}$$

Usually, however, it is desirable to minimize the $Q$ sensitivity with respect to a parameter, $t$, (e.g., temperature, supply voltage, etc. and

(18) $$S_t{}^{Q}=S_{K_1}{}^{Q}S_t{}^{K_1}+S_{K_2}{}^{Q}S_t{}^{K_2}$$

Performance data on the actual amplifiers is necessary to minimize $S_t^Q$ however, a reasonable sensitivity criterion is to let $S_{K_1}^{Q}S_t^{K_1}=S_{K_2}^{Q}S_t^{K_2}$ that is, let $a=S_t^{K_1}$ and $b=S_t^{K_2}$ in Eq. (14). In the absence of a priori knowledge of $S_t^{K_1}$ and $S_t^{K_2}$ it is reasonable to assume that they are proportional to the gain. Therefore, $a=K_1$ and $b=K_2$ should be chosen for use in Eq. (14). Under the condition then, that $K_1S^Q_{K_1}=K_2S^Q_{K_2}$, the following results may be obtained:

(19*a*) $$K_1=1-(M+1)^{-1/2}$$

(19*b*) $$K_2=(M+1)^{1/2}-1$$

(19*c*) $$S_{K_1}{}^{Q}=S_M{}^{Q}\frac{M+1}{M}[(M+1)^{1/2}-1]$$

(19*d*) $$S_{K_2}{}^{Q}=S_M{}^{Q}\frac{M+1-(M+1)^{1/2}}{M}$$

If $K_1$ is provided by the cascade connection of two unity gain amplifiers separated by a resistive divider, as is quite practical, the actual amplifier gain is unity and since the sensitivity of the resistive divider is small enough to be neglected, the proper optimization would then be $a=1$, $b=K_2$, i.e., $S^Q_{K_1}=K_2S^Q_{K_2}$. Under this condition the following equations are obtained:

(20*a*) $$K_1=[2M+1-(4M+1)^{1/2}]/2(M+1)$$

(20*b*) $$K_2=[(4M+1)^{1/2}-1]/2$$

(20*c*) $$S_{K_1}{}^{Q}=S_M{}^{Q}\frac{M+1}{2M^2}[(M+1)(4M+1)^{1/2}-3M-1]$$

(20*d*) $$S_{K_2}{}^{Q}=S_M{}^{Q}\frac{M+1}{2M^2}[2M+1-(4M+1)^{1/2}]$$

If one chooses for a design example that $Q=25$ is may be found from Eq. (10) that $M=10.89$. By also selecting the criterion that $K_1S^Q_{K_1}=K_2S^Q_{K_2}$ it may be found from Eq. (19*a*) that $K_1=0.710$ and from Eq. (19*b*) that $K_2=2.440$. Eq. (19*c*) gives $S^Q_{K_1}=46.61$ and Eq. (19*d*) gives $S^Q_{K_2}=13.56$.

Table I summarizes this data and compares it to the two single-loop circuits of FIG. 1*a* and 1*b* as well as the alternative optimizations of $S^Q_{K_1}=S^Q_{K_2}$ and $S^Q_{K_1}=K_2S^Q_{K_2}$.

TABLE I

[Gains and Sensitivities for Q=25]

| Figure | $K_1$ | $K_2$ | $S_{K_1}{}^Q$ | $S_{K_2}{}^Q$ | $K_1S_{K_1}{}^Q$ | $K_2S_{K_2}{}^Q$ |
|---|---|---|---|---|---|---|
| 1 | 0.916 | ---------- | 200 | ---------- | 183 | ---------- |
| 3 | ---------- | 10.85 | ---------- | 17.5 | ---------- | 189 |
| With $S_{K_1}{}^Q=S_{K_2}{}^Q$ | | | | | | |
| 5 | 0.458 | 5.425 | 16.14 | 16.14 | 7.39 | 87.6 |
| With $K_1S_{K_1}{}^Q=K_2S_{K_2}{}^Q$ | | | | | | |
| 5 | 0.710 | 2.440 | 46.61 | 13.56 | 33.1 | 33.1 |
| With $S_{K_1}{}^Q=K_2S_{K_2}{}^Q$ | | | | | | |
| 5 | 0.677 | 2.838 | 37.23 | 13.12 | 25.20 | 37.23 |

From the above table it is readily seen that the multiloop circuit of FIG. 5 provides a considerable improvement in gain, sensitivity, and gain-sensitivity products compared to either of the single-loop circuits shown in FIGS. 1 and 3.

In practice, either the $K_1S^Q_{K_1}=K_2S^Q_{K_2}$ optimization or $S^Q_{K_1}=K_2S^Q_{K_2}$ would be chosen depending on the method of realization of $K_1$.

Figure 8:
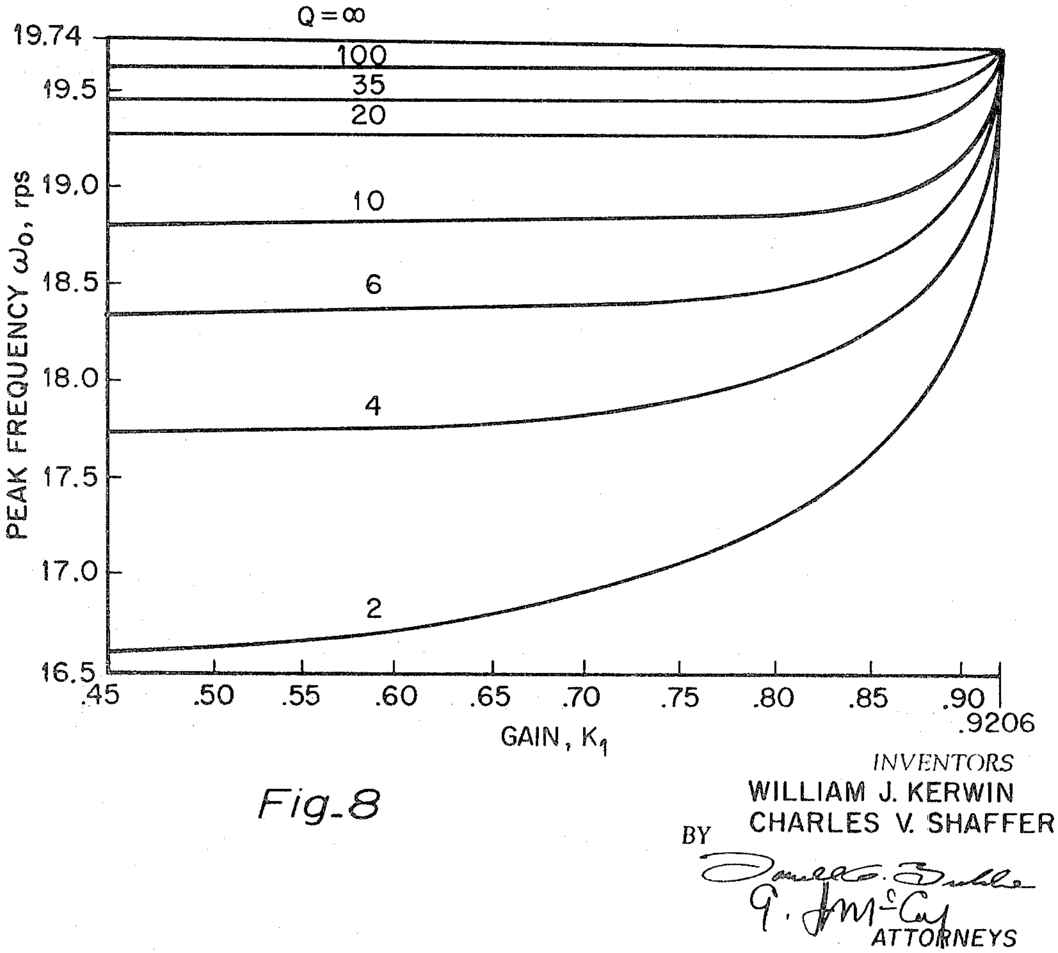
FIG. 8 is a diagram illustrating the frequency of peak response vs. $K_1$ for the circuit of FIG. 5 for $RC=1$ sec.

The frequency of peak response as a function of $Q$ and $K_1$ for the circuit in FIG. 5 of $RC=1$ sec. is shown in FIG. 8. Since oscillation occurs when $K_1$ reaches 0.9206, all the curves intersect at this value of gain. Under this condition the frequency of oscillation is $2\pi^2=19.74$ r.p.s.$=\pi$ Hz.

Figure 9:
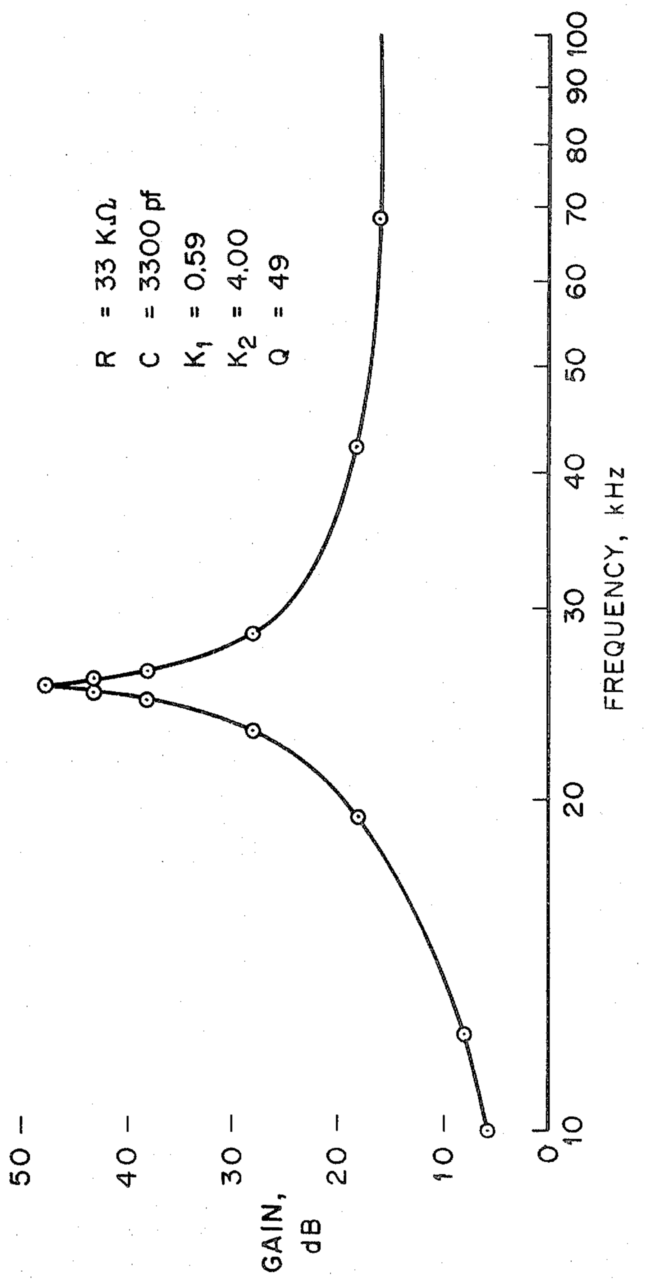
FIG. 9 is a plot of an exemplary measured performance of a circuit such as is illustrated in FIG. 5.

The amplitude response of the circuit shown in FIG. 5 was measured when operating with $K_1=0.59$ and $K_2=4.0$ and the response curve is shown in FIG. 9. The expected Q under these conditions (FIG. 7) is 50 and the measured Q was 49. The expected frequency of peak response for $RC=1$ sec. ($Q=50$) is 19.5 r.p.s. (FIG. 8). Therefore, for the $RC$ values shown in FIG 9, the expected frequency of peak response is $2.8\times10^4$ Hz. The measured peak was $2.6\times10^4$ Hz. The difference was probably due to a small amount of amplifier phase shift at the operating frequency.

Figure 10:
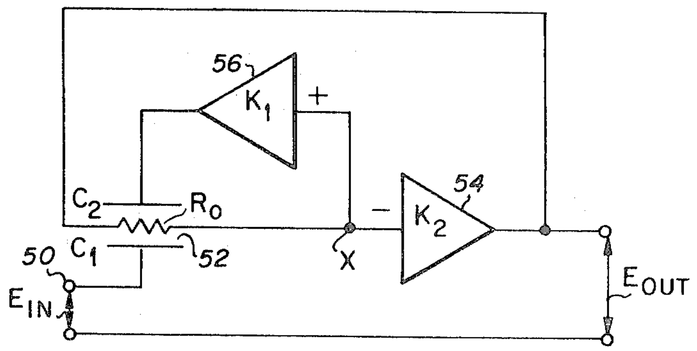
FIG. 10 is a circuit generally similar to that of FIG. 5 except that it provides a 0 at 0 frequency and does not require a differential amplifier.

Referring now to FIG. 10 of the drawing, there is shown a circuit which is generally similar to that shown in FIG. 5 except that one of the input terminals 50 is coupled into the input of amplifier 54 through a distributed capacitance $C_1$ of the passive element 52 so as to provide a 0 at 0 frequency and to eliminate the need for a differential amplifier at 54 to provide $K_2$. As in the circuit of FIG. 5, a positive gain amplifier 56 is used to provide $K_1$.

Figure 11:
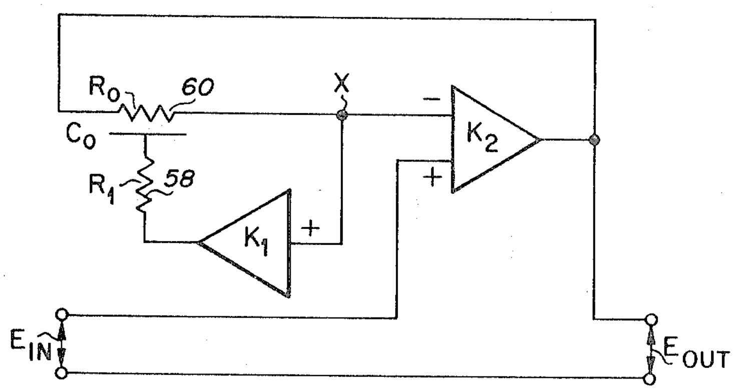
FIG. 11 is a circuit utilizing an RC "notch filter" to provide a circuit in accordance with the present invention having small amplifier gain.

In FIG. 11 of the drawing, still another modification of the present invention is illustrated using an RC "notch filter" comprising the resistance 58 and the integrated RC element 60.

Figure 12:
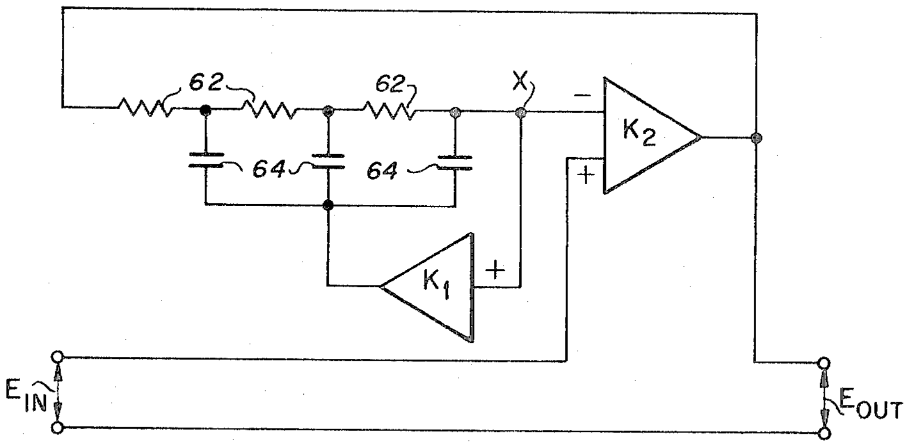
FIG. 12 is a circuit similar to that illustrated in FIG. 5 except that lumped passive elements are utilized.

In FIG. 12, still another circuit similar to that illustrated in FIG. 5 of the drawing is shown using lumped passive elements in the form of resistors 62 and capacitors 64.

Figure 13:
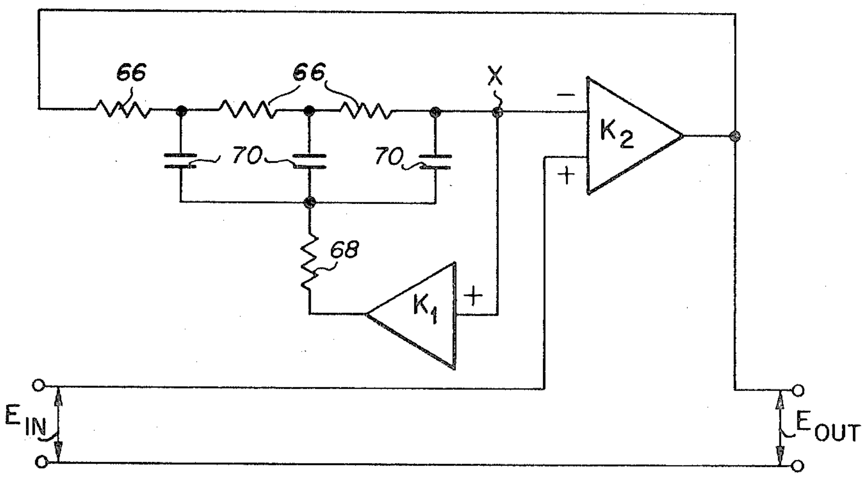
FIG. 13 is a circuit similar to that illustrated in FIG. 11 except that lumped passive elements are utilized.

Another circuit similar to that of FIG. 11 is shown in FIG. 13 except that lumped passive elements such as the resistors 66 and 68 and capacitors 70 are utilized.

Figure 14:
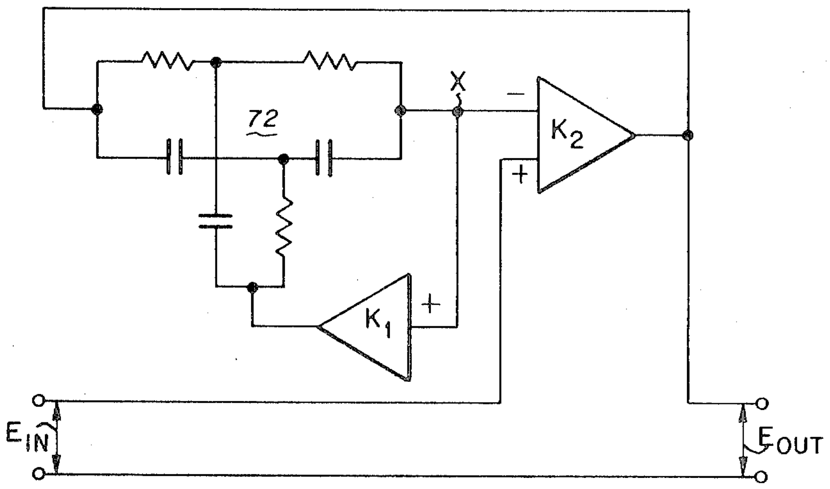
FIG. 14 is a circuit similar to that of FIG. 11 except that a twin-T network is used for the passive structure.

In FIG. 14 of the drawing, another circuit similar to that of FIG. 11 is illustrated except that a twin-T network 72 is used for the passive structure.

It should be noted that it is possible to add an additional passive element between the node X of any of these circuits and the common node of the input $E_{in}$ and output $E_{out}$ for the purpose of providing finite complex or $j\omega$ axis zeros. It will also be noted that the distributed integrated circuit elements of the circuits of FIGS. 5, 10 and 11 provide filter designs with substantially fewer elements than the previously used lumped filters.

The use of the multiloop feedback networks in accordance with the present invention has thus been shown to provide a considerable reduction in sensitivity and gain-sensitivity products in active distributed RC networks as compared to single-loop circuits. The improvement in stability for a given Q is about a factor of 6 in gain-sensitivity products. Furthermore, the design equations presented allow various optimizations depending on the specific requirements, that is, equal Q sensitivities to change in the gain of either amplifiers, or eqUal gain-sensitivity products for the two amplifiers, etc. The use of a single RC line provides 0 Q sensitivity to passive element variation and allows tuning, for example, by varying the DC bias on a depletion layer capacity in a monolithic distributed RC structure without any effect on the resonant Q.

The circuit of FIG. 5 provides a Q which is totally independent of the passive element values. This, of course, is true also of the circuit shown in FIG. 10 if the ratio $C_2/C_1$ does not change. Moreover, all of the above circuits can be designed to provide lower sensitivity to environmental changes than are possible with single amplifier, single feedback loop designs. Also, all allow the use of lower gain amplifiers than do single loop structures with low sensitives to gain changes.

Whereas only a few of the possible variations of the present invention are illustrated and described above, it is contemplated that after having read the above disclosure, many more alternations and modifications of the present invention will become apparent to those skilled in the art and it is therefore to be understood that this disclosure is of preferred embodiments described for purposes of illustration only. Accordingly, it is intended that the appended claims be interpreted as covering all modifications which fall within the true spirit and scope of the invention.

What is claimed is:

1. An active filter network comprising:
electrode means for entering an input signal;
electrode means for extracting an output signal;
a first amplifier having first and second inputs and an output;
a passive RC network having first, second, and third terminals;
a second amplifier having at least one input and an output;
said entering means being coupled to said extracting means;
said entering means being further coupled to said second input of said first amplifier;
said output of said first amplifier being coupled to said extracting means and said second terminal of said passive network;
means interconnecting said first terminal of said passive network, said input of said second amplifier, and said first input of said first amplifier; and
means for connecting said output of said second amplifier to said third terminal of said passive network.

2. An active filter network as recited in claim 1 wherein said first input of said first amplifier is an inverting input and said input of said second amplifier is a noninverting input.

3. An active filter network as claimed in claim 2 wherein said three-terminal passive RC network comprises a twin-T network.

4. An active filter network as claimed in claim 2 wherein said three-terminal passive RC network includes a distributed RC network, and a resistive element of said distributed RC network is connected between said first and second terminals of said passive network.

5. An active filter network as claimed in claim 2 wherein said passive RC network is comprised of lumped resistance and capacitive elements.

6. An active filter network as set forth in claim 2 wherein said passive RC network comprises a four-terminal distributed RC network having a resistive element and two capacitive elements, said second input of said first amplifier is unused, and the fourth terminal of said distributed RC network is connected to said entering means.

7. An active filter network as recited in claim 2 wherein said second amplifier has a second input connected to said entering means and the overall transfer function of said active filter network is $$T_2(p)=K_2\,\frac{T_1^{-1}(p)+\dfrac{K_1}{1-K_1}}{T_1^{-1}(p)+\dfrac{K_1+K_2}{1-K_1}}$$

where $T_1{}^{'7E'1}(p)$ is the transfer function of the passive network, $K_1$ is the gain of said second amplifier and $K_2$ is the gain of said first amplifier.

8. An active filter network as recited in claim 7 wherein the inputs of both of said amplifiers are differential.

9. An active filter network as recited in claim 2 wherein said inputs of said first amplifier are differential inputs.

10. An active filter network as recited in claim 9 wherein the gain of said first amplifier is in excess of one and the gain of said second amplifier is less than unity.

* * * * *